UNITED STATES PATENT OFFICE.

ALFRED W. BOSWORTH, OF MILTON, MASSACHUSETTS, ASSIGNOR TO THE BOSTON FLOATING HOSPITAL, OF BOSTON, MASSACHUSETTS, A CORPORATION OF MASSACHUSETTS.

RECONSTRUCTED MILK AND PROCESS OF MAKING SAME.

1,341,040. Specification of Letters Patent. Patented May 25, 1920.

No Drawing. Application filed July 1, 1918. Serial No. 242,859.

*To all whom it may concern:*

Be it known that I, ALFRED W. BOSWORTH, a citizen of the United States, residing at Milton, in the county of Norfolk and State of Massachusetts, have invented a certain new and useful Reconstructed Milk and Process of Making Same, of which the following is a specification.

My invention relates to a reconstructed milk and a process for preparing the same, its objects being the formation of a compound which will be almost perfectly digestible and assimilable, particularly for infants, will contain the vitamins or food accessories necessary for normal growth and development, which will prevent nutritional derangements, and which will be adaptable to variation according to the requirements of individual cases; other objects will more fully appear hereinafter.

My invention is based upon observations with respect to the proportional relation between constituents of the milk of the cow or other lower mammals; comparisons thereof with the proportional relation between the constituents of human milk; upon studies of the effects of the various constituents and of their proportions when used as foods, particularly for the human infant; and upon numerous other studies of such foods and their nutritional functioning. With respect to these observations and studies and their results it may be noted, among other facts, that the milk of the cow and other lower mammals contains excessive amounts of calcium and other mineral elements which interfere with the digestibility and assimilability of such milks by human infants; that the relative proportion between the mineral elements is of great importance; that potassium is not present in such milks in the same relative proportion as in human milk; that the amounts of volatile esters in the fats of such milk is much greater than in human milk; that the vitamins or food accessories, both water-soluble and fat-soluble, present in the milk are necessary for normal growth and development and must be retained throughout the treatment of the milk, and other facts which will be further referred to hereinafter.

My invention contemplates the treatment of the milk of the cow or of other mammals capable of similar treatment, hereinafter referred to by the term "milk," in such manner as to separate it into certain constituent elements, and the further treatment and recombination of a proper proportion of these elements together with other ingredients, if necessary, to produce a reconstructed milk containing the vitamins and the various food and mineral constituents in such proportions and amounts as to be almost completely digestible and assimilable when used as a human food, and, if desired, as a food for infants, to completely replace human milk.

The separation of the milk into its constituents and their subsequent treatment and recombination may be effected in accordance with my invention in a number of ways; that which I prefer is further recited hereinafter as illustrative thereof.

In accordance with my invention I may utilize raw, fresh cows' milk as the initial material. This I may first separate into three parts, viz: cream, casein and whey or serum in the following manner, any treatment distinctive of the so-called vitamins or food accessories being entirely avoided.

The milk is first subjected to centrifugal action, whereby substantially all of the fat is removed in the form of cream, which is further treated as hereinafter described. The fat-free milk is then freed from its casein, preferably by warming to a temperature of 35° C. and adding a 2.5% solution of phosphoric acid to an amount sufficient to exactly precipitate the casein, excess of acid being avoided as it causes some of the casein to be redissolved. The amount of phosphoric acid solution will, of course, vary with the acidity and amount of casein present in the milk, which factors vary with each lot of milk. Usually 1 liter of the 2.5% phosphoric acid solution will be required for each 8 liters of milk. The casein, or a mixture of casein and acid caseinate, precipitates out in large flocculent masses, and is separated from the whey or serum by filtration. The separated cream, casein and serum are then individually treated for their purification and adaptation to recombination in accordance with the requirements previously set forth.

The separated cream is churned mechanically into butter in known manner. The butter thus formed is warmed to its melting point, excess of heat being carefully avoided. On standing, the clear fat separates from the water, salts, curd, etc., and is decanted therefrom. By such procedure the fat soluble vitamins or food accessories contained in the butter fat are retained therein in their full power.

The crude casein precipitated from the fat-free milk is purified, for example, as follows. It is suspended in a quantity of water equal in volume to one-half the volume of the original milk from which it was separated, and to this suspension sodium hydroxid is added in the proportion of 1.5 grams for each liter of water. On agitation the sodium hydroxid dissolves the casein. After solution the casein is reprecipitated by the addition of dilute acetic acid. The casein settles, the water is poured off, and the casein is then washed with several fresh portions of water. By this means a casein is obtained which is quite pure, containing substantially no calcium. It may be desiccated and stored for further use, or may be converted into ammonium, potassium, sodium or other caseinate and then desiccated.

The serum or whey remaining after the removal of the casein from the fat-free milk is treated in such manner as to remove therefrom substantially all of its calcium and phosphorous content while retaining therein all other salts, food compounds and food accessories or vitamins present. In order to effect this I may proceed as follows: The acidity of the filtered serum is determined on 100 cc. thereof by titration with N/10 sodium hydroxid. Sufficient 4% milk of lime is then added to reduce the acidity, primarily due to phosphoric acid and acid phosphates, to two degrees (i. e. so that 100 cc. requires 2 cc. of N/10 alkali to make it neutral to phenolphthalein). The addition of the milk of lime to this extent causes precipitation of insoluble calcium phosphate, whereas further addition thereof results in the precipitation of the citric acid present as calcium citrate, which is to be avoided. The precipitated calcium phosphate is removed from the serum by filtration and the serum is utilized as such or after concentration or desiccation, as described in my previous Patent No. 1,246,858. In this serum all the water soluble vitamins or food accessories will be retained in their full power.

Having separated the milk into constituents in which the salts, food products and vitamins or food accessories are retained, with the exception of calcium and phosphorous compounds, all but a trace of which are removed, I then recombine these constituents, together with additional food compounds where necessary, in such manner and in such proportions that the resulting reconstructed milk will contain its constituent salts, food compounds and food accessories or vitamins in the proper proportions and relations for substantially complete digestion and assimilation thereof and for producing proper nutrition, growth and development when used as a food, particularly for the human infant. The details of the recombination of the original milk constituents are necessarily varied in accordance with the food requirements of the individual consumer; in general, for the normal infant, I prefer to recombine the milk constituents in the following manner:

After determining quantitatively the chlorin content of the milk serum produced in accordance with the above recited procedure, I calculate from the amount of serum taken the final volume of the reconstructed milk product to be obtained so that the latter may contain 0.5 gram chlorin per liter. To the amount of serum taken water, preferably distilled, is added to dilute or dissolve the serum and bring the volume to 9/10 of the final volume to be obtained.

From predetermined data collected from experiments and observations I have found that when diluted to 1000 cc. there will be associated with the 0.5 gram of chlorin in the serum lactose sufficient to give 2.6%; protein, chiefly lactalbumin, to give 0.31%; and only slight traces of calcium and phosphorus (0.01% Ca and 0.0013% P). To bring the amounts of these substances to the proper proportions I add 39 grams of sugar, preferably lactose, although sucrose or other sugar may be used, 11.9 grams of protein, preferably casein produced as above recited and in the form of potassium caseinate and 0.68 gram of calcium phosphate ($CaHPO_4$). The use of potassium caseinate supplies the potassium necessary to bring about the proper relative proportion of this element. These substances are dissolved in the diluted serum, which may be gently heated to aid complete solution.

I next introduce into the serum the proper amount of fats, preferably containing esters of volatile fatty acids and vitamins in the proper proportions. To secure these proportions I prefer to mix butter fat with another edible fat, for example, olive oil, in the proportions of 1 to 5. In the present example I may take 5.5 grams of butter fat and 27.5 grams of olive oil and incorporate them into the serum by emulsification. This is effected preferably at a temperature just sufficient to maintain the fats liquefied. The fats are preferably first passed through the emulsifying machine or homogenizer with a portion of the serum to break them up, and are then added to the remainder of the serum and the entire mixture passed through the machine, which is adjusted to give a high degree of emulsification. After the mixture of serum and fat has passed through the machine the final traces of the milk are washed out by forcing through a small amount of distilled water, and finally sufficient distilled water is added to make up the determined volume of reconstructed milk.

The milk reconstructed in accordance with the above specific directions has the proportions hereinafter stated, which, for the purposes of comparisons, are tabulated with proportions and ingredients of normal cows' milk and normal human milk. Proportions of constituents are expressed in grams per 100 cc.

|  | Cows' milk. | Human milk. | Reconstructed milk. |
|---|---|---|---|
| Total fat | 3.90 | 3.30 | 3.30 |
| Volatile fatty acids in fat | 0.33 | 0.046 | 0.046 |
| Lactose | 4.90 | 6.50 | 6.50 |
| Protein | 3.20 | 1.50 | 1.50 |
| Citric acid | 0.24 | 0.11 | 0.17 |
| Ash | 0.70 | 0.20 | 0.23 |
| Potassium | 0.12 | 0.07 | 0.07 |
| Sodium | 0.05 | 0.02 | 0.03 |
| Chlorin | 0.08 | 0.04 | 0.05 |
| Calcium | 0.14 | 0.03 | 0.03 |
| Magnesium | 0.012 | 0.003 | 0.008 |
| Phosphorus | 0.12 | 0.016 | 0.030 |

Without departing from my invention I may vary the proportions of the constituents and the method of recombining them in accordance with the individual requirements of the consumer, whether normal or abnormal.

After reconstruction, the milk prepared in accordance with my invention may be properly bottled, pasteurized or sterilized, according to known methods, destruction of the vitamins being carefully avoided.

Without being limited to the specific procedure and proportions hereinbefore recited, what I claim as my invention is:

1. The process of preparing a reconstructed milk from non-human milk which comprises separating the fat with the fat-soluble vitamins or food accessories and the casein from the serum of said milk, removing substantially all of the calcium and phosphorus from the serum while preserving the vitamins or food accessories therein, and recombining the resulting serum with a portion of the fat and with protein.

2. The process of preparing a reconstructed milk from non-human milk which comprises separating the fat, with the fat-soluble vitamins or food accessories, and the casein from the serum of said milk, removing substantially all of the calcium and phosphorus from the serum while preserving the vitamins or food accessories therein, and recombining the resulting serum with a portion of the fat and with protein and calcium and phosphorus in proportional amounts substantially the same as in human milk.

3. The process of preparing a reconstructed milk from non-human milk which comprises separating the fat with the fat-soluble vitamins or food accessories and the casein from the serum of said milk, removing substantially all of the calcium and phosphorus from the serum while preserving the vitamins or food accessories therein, and recombining the resulting serum with the fat and protein and with other fats, sugars and protein in such proportion that the constituents of the reconstructed milk are in the same relative proportions as in normal human milk.

4. The process of reconstructing milk which comprises separating the fat with the fat-soluble vitamins or food accessories and the casein from the serum of said milk, removing substantially all of the calcium and phosphorus from the serum while preserving the vitamins or food accessories therein, and combining the resulting serum with fat, protein, sugar and salts.

5. A reconstructed milk containing fats, sugar, proteids, organic salts and inorganic elements in substantially the proportional amounts present in human milk, wherein the butter fat, casein and serum as separate elements are recombined, the serum having had its excess calcium and phosphorus removed and the butter fat and casein added in a less amount than that in which they existed in the original milk.

6. A reconstructed milk containing the same organic and inorganic elements or ingredients and in substantially the same proportional amounts, as those present in human milk, the reconstructed milk being produced by a combination of butter fat, casein and serum as separate elements, the latter having had its calcium and phosphorus content lowered to the requisite degree.

7. A reconstructed milk containing the same organic and inorganic elements or ingredients and in substantially the same proportional amounts, as those present in human milk, the reconstructed milk being produced by a combination of butter fat, casein and serum as separate elements, the latter having had its calcium and phosphorus content lowered to the requisite degree, together with other fats, sugars and proteins.

8. A reconstructed milk containing the same organic and inorganic elements or ingredients and in substantially the same proportional amounts, as those present in human milk, the reconstructed milk being produced by a combination of butter fat, casein and serum as separate elements, the latter having had its calcium and phosphorus content lowered to the requisite degree and the milk having an ash content of substantially 0.23 gram per 100 cc.

9. A reconstructed milk containing the same organic and inorganic elements or ingredients and in substantially the same proportional amounts, as those present in human milk, the reconstructed milk being produced by a combination of butter fat, casein and serum as separate elements, the latter having had its calcium and phosphorus content lowered to the requisite degree together with other fats, sugars, proteins and salts and the milk having an ash content of substantially 0.23 gram per 100 cc.

In testimony whereof I have signed my name to this specification.

ALFRED W. BOSWORTH.